United States Patent
Palfai et al.

(10) Patent No.: US 10,683,920 B2
(45) Date of Patent: Jun. 16, 2020

(54) TORQUE LIMITER FOR USE WITH A DUAL PLANETARY/INTEGRATED DIFFERENTIAL DRIVE TRAIN

(71) Applicant: Atieva, Inc., Newark, CA (US)

(72) Inventors: Balazs Palfai, Dublin, CA (US); Pablo Ramaswamy, Hayward, CA (US); Michael Tebbe, Redwood City, CA (US); Richard J. Biskup, Sunnyvale, CA (US)

(73) Assignee: ATIEVA, INC., Newark, CA (US)

( * ) Notice: Subject to any disclaimer, the term of this patent is extended or adjusted under 35 U.S.C. 154(b) by 28 days.

(21) Appl. No.: 16/195,320

(22) Filed: Nov. 19, 2018

(65) Prior Publication Data

US 2020/0124149 A1 Apr. 23, 2020

Related U.S. Application Data

(63) Continuation-in-part of application No. 16/182,755, filed on Nov. 7, 2018, which is a continuation-in-part of application No. 16/181,612, filed on Nov. 6, 2018.

(60) Provisional application No. 62/766,523, filed on Oct. 23, 2018.

(51) Int. Cl.
| | |
|---|---|
| *F16H 35/10* | (2006.01) |
| *F16D 43/21* | (2006.01) |
| *F16D 7/02* | (2006.01) |
| *B60K 17/04* | (2006.01) |
| *B60K 7/00* | (2006.01) |
| *B60L 15/20* | (2006.01) |

(52) U.S. Cl.
CPC .......... *F16H 35/10* (2013.01); *B60K 7/0007* (2013.01); *B60K 17/046* (2013.01); *F16D 7/02* (2013.01); *F16D 43/21* (2013.01); *B60K 2007/0038* (2013.01); *B60L 15/20* (2013.01)

(58) Field of Classification Search
CPC . F16H 35/10; F16D 43/21; F16D 7/02; B60K 7/0007; B60K 17/046; B60K 2007/0038
USPC .............. 180/372; 475/317; 192/3.52, 223.3, 192/54.2, 55.1, 66.22, 70.2, 70.24, 70.27
See application file for complete search history.

(56) References Cited

U.S. PATENT DOCUMENTS

| | | | | |
|---|---|---|---|---|
| 1,925,943 | A | * 9/1933 | Stein | ....................... F16H 35/10 74/7 C |
| 5,906,249 | A | * 5/1999 | Monkkonen | ......... B60K 7/0015 180/292 |
| 6,076,438 | A | * 6/2000 | Rahm | ..................... B25B 13/48 173/176 |
| 8,967,004 | B2 | 3/2015 | Palfai et al. | |
| 2003/0032519 | A1 | 2/2003 | Lovatt | |

(Continued)

FOREIGN PATENT DOCUMENTS

EP 2228157 A1 * 9/2010 ........... B25B 23/141

*Primary Examiner* — Roger L Pang
(74) *Attorney, Agent, or Firm* — Patent Law Office of David G. Beck

(57) ABSTRACT

A torque limiting clutch assembly is provided that is mounted between the motor housing and the ring gear of a planetary gear assembly. During normal operation, the clutch assembly prevents rotation of the ring gear relative to the motor housing. In the event of a severe loading condition, the clutch assembly slips, thereby preventing excessive torque from being applied to the drive train and potentially damaging one or more drive train components.

20 Claims, 8 Drawing Sheets

(56) References Cited

U.S. PATENT DOCUMENTS

| | | | |
|---|---|---|---|
| 2003/0114265 A1* | 6/2003 | Larson | F16D 67/00 |
| | | | 475/249 |
| 2006/0211534 A1* | 9/2006 | Roberts | B25B 21/00 |
| | | | 475/317 |
| 2011/0042160 A1 | 2/2011 | Schapf | |
| 2013/0281247 A1 | 11/2013 | Holmes | |
| 2014/0054125 A1* | 2/2014 | Diemer | F16D 13/52 |
| | | | 192/70.2 |
| 2015/0013488 A1 | 1/2015 | Matsuoka et al. | |
| 2016/0207396 A1 | 7/2016 | Pritchard et al. | |
| 2016/0230841 A1* | 8/2016 | Hiramatsu | F16H 1/32 |

* cited by examiner

TORQUE LIMITER FOR USE WITH A DUAL PLANETARY/INTEGRATED DIFFERENTIAL DRIVE TRAIN

CROSS-REFERENCE TO RELATED APPLICATION

This application is a continuation-in-part of U.S. patent application Ser. No. 16/182,755, filed 7 Nov. 2018, which is a continuation-in-part of U.S. patent application Ser. No. 16/181,612, filed 6 Nov. 2018, which claims benefit of the filing date of U.S. Provisional Patent Application Ser. No. 62/766,523, filed 23 Oct. 2018, the disclosures of which are incorporated herein by reference for any and all purposes.

FIELD OF THE INVENTION

The present invention relates generally to electric motors and, more particularly, to a torque limiting device that provides overload protection in an electric vehicle drive train.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drivetrains into their vehicle line-ups. To meet consumer expectations, however, the automobile industry must not only achieve a greener drivetrain, but must do so while maintaining reasonable levels of performance, range, reliability, safety and cost.

The most common approach to achieving a low emission, high efficiency car is through the use of a hybrid drivetrain in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at a reduced level compared to a conventional vehicle. Additionally, due to the inclusion of both an internal combustion engine and an electric motor(s) with its accompanying battery pack, the drivetrain of a hybrid vehicle is typically more complex than that of either a conventional ICE-based vehicle or an all-electric vehicle, resulting in increased cost and weight. Accordingly, several vehicle manufacturers are designing vehicles that only utilize an electric motor, thereby eliminating one source of pollution while significantly reducing drivetrain complexity.

In order to achieve the desired level of wheel torque in an electric vehicle (EV), the powertrain is typically coupled to the wheels using a suitable gear reduction assembly. Under normal driving conditions this approach provides a highly efficient drive train. Unfortunately under certain abnormal driving conditions that result in a loss and then a regain of traction, this approach can lead to an excessive load being placed on the drive train. This load is due to the rapid decrease in motor speed that occurs when the wheels regain traction. Depending upon the length of time during which traction is lost, when traction is regained the deceleration related inertia torque can generate excessively large torque loads that can damage various drive train components. Although the drive train can be designed to withstand these torque loads, this approach leads to a greatly over designed, expensive and heavy drive train. Accordingly, what is needed is a system that can limit drive train load to a useful range. The present invention provides such a system.

SUMMARY OF THE INVENTION

The present invention provides a torque limiting clutch assembly comprised of a clutch plate assembly, a planetary gear assembly, an electric motor housing member and a spring member. The clutch plate assembly is comprised of a plurality of first clutch plates and a plurality of second clutch plates, where the first and second clutch plates are interlaced to form an alternating pattern of first and second clutch plates. The clutch plate assembly is configured to encircle the planetary gear assembly, where a coupling between the ring gear of the planetary gear assembly and the plurality of first clutch plates results in each first clutch plate being interlocked with the ring gear. The clutch plate assembly is further configured to be mounted within the electric motor housing member, where a coupling between the electric motor housing member and the plurality of second clutch plates results in each second clutch plate being interlocked with the electric motor housing member. The spring member is configured to apply a preloading force on the clutch plate assembly. The preloading force prevents rotation of the ring gear relative to the electric motor housing under a first operating condition, while the preloading force is insufficient to prevent rotation of the ring gear relative to the electric motor housing under a second operating condition. The torque limiting clutch assembly may be integrated into a vehicle's drive train in which case the first operating condition is defined as a normal vehicle operating condition and the second operating condition is defined as a severe vehicle drive train loading condition. During a severe vehicle drive train loading condition the torque level applied to the torque limiting clutch assembly exceeds the preloading force and allows slippage between the plurality of first clutch plates and the plurality of said second clutch plates. The first and second clutch plates may be fabricated from materials exhibiting a high coefficient of friction and which are suitable to handle excessive generated heat. Similarly, the first and second clutch plates may be coated with materials exhibiting a high coefficient of friction and which are suitable to handle excessive generated heat.

In one aspect, the coupling between the ring gear and each of the first clutch plates may be comprised of a first plurality of features formed on an exterior surface of the ring gear and a second plurality of features, complementary to the first plurality of features, formed on each of the first clutch plates. The first plurality of features are preferably a first plurality of teeth formed on the exterior surface of the ring gear and the second plurality of features are preferably a second plurality of teeth formed on an inner cylindrical surface of each of the first clutch plates, where the first plurality of teeth and the second plurality of teeth are configured to interlock when the clutch plate assembly encircles the planetary gear assembly.

In another aspect, the coupling between the electric motor housing member and each of the second clutch plates may be comprised of a first plurality of features formed on an interior surface of the electric motor housing member and a second plurality of features, complementary to the first plurality of features, formed on each of the second clutch plates. The first plurality of features are preferably a first plurality of teeth formed on the interior surface of the electric motor housing member and the second plurality of features are preferably a second plurality of teeth formed on an outer cylindrical surface of each of the second clutch plates, where the first plurality of teeth and the second plurality of teeth are configured to interlock when the clutch plate assembly is mounted within the electric motor housing member.

In another aspect, the spring member may be a conical spring that is compressed when the torque limiting clutch assembly and the planetary gear assembly are mounted to the electric motor housing.

In another aspect, the torque limiting clutch assembly may further include a secondary feature configured to apply an additional preloading force on the clutch plate assembly. The secondary feature includes (i) a ring member proximate to the end clutch plate, where the end clutch plate is one of the plurality of first clutch plates; (ii) a plurality of slots formed within a surface of the ring member, where each of the slots is of a non-uniform depth; and (iii) a plurality of balls (e.g., ball bearings) held within the plurality of slots, where the diameter of the balls exceeds the maximum depth of each slot, where during rotation of the end clutch plate relative to the ring member each ball moves from a first slot region towards a second slot region that is shallower than the first slot region, thereby compressing the clutch plate assembly. The ring member may be integral to the electric motor housing member.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation; similarly a first step could be termed a second step; similarly a first component could be termed a second component, all without departing from the scope of this disclosure.

Figure 1:
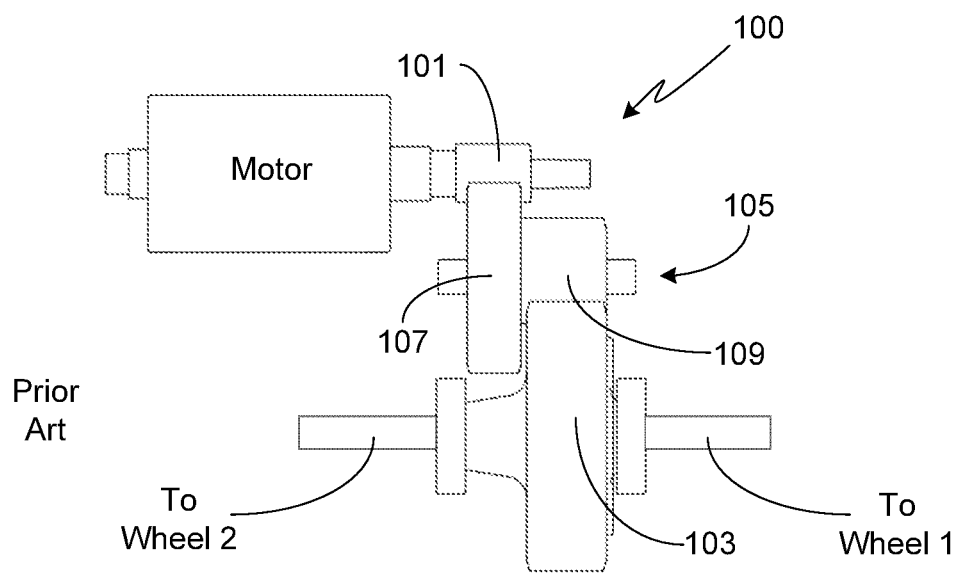
FIG. 1 provides a simplified side view of an electric vehicle powertrain in accordance with the prior art.

FIG. 1 provides a side view of a commonly employed electric vehicle powertrain 100. For purposes of clarity, this figure does not show gear teeth. As shown, input gear 101 is coupled to differential gear 103 via idler gear assembly 105. While this configuration is relatively straightforward to design and manufacture, it requires considerable volume.

Figure 2:
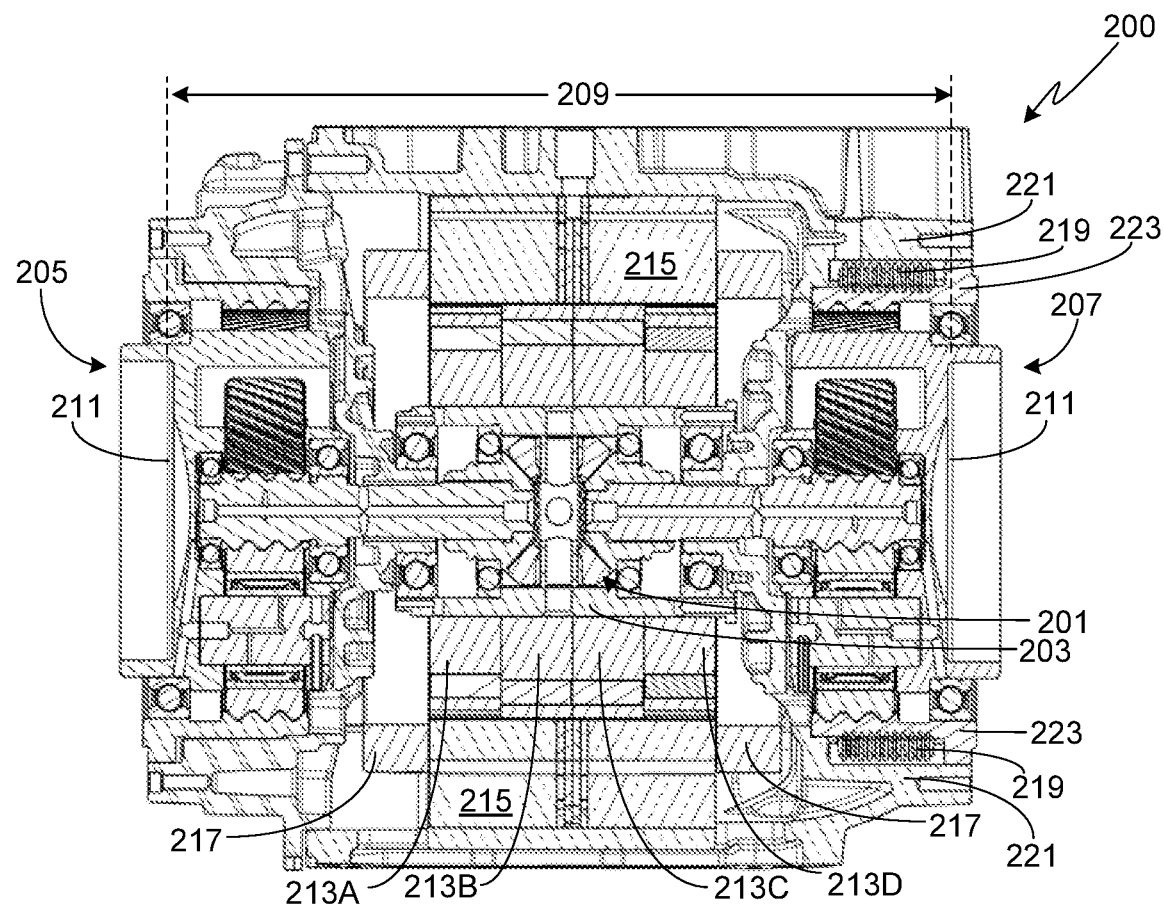
FIG. 2 provides a cross-sectional view of a powertrain assembly incorporating the torque limiter of the invention.

To overcome the limitations of the design shown in FIG. 1, a preferred configuration coaxially aligns the traction motor with the drive wheel axes as illustrated in the configuration shown in FIG. 2. Powertrain assembly 200 incorporates a differential gear assembly 201 within hollow rotor shaft 203. Utilizing the active core configuration, powertrain assembly 200 is arranged such that planetary assembly 205, differential gear assembly 201, and planetary assembly 207 are coaxially aligned, thereby creating a powertrain with a relatively short width 209, where width 209 is measured between the bottom surfaces 211 of the two constant velocity (i.e., CV) joint housing members.

Although not required by the invention, in the illustrated assembly hollow rotor shaft 203 is directly connected to the rotor lamination stack, thereby achieving a high speed motor proportion configuration suitable for use in an electric vehicle (EV). In the illustrated embodiment, the lamination stack is comprised of four lamination pack layers 213A-213D. It should be understood that this lamination stack configuration is not required by the invention. Surrounding the rotor lamination stack is stator 215. Visible in this view are the stator windings 217 that extend from either end of the stator.

As described in detail below, the present invention provides a torque limiting clutch assembly 219 that is mounted between motor housing 221 and the ring gear 223 of the —planetary gear assembly 207. In the illustrated configuration, clutch assembly 219 is only incorporated into one of the planetary gear assemblies, specifically assembly 207. Due to the preferred, and illustrated, configuration in which the differential is interposed between the two planetary assemblies, it is only necessary to utilize a single torque limiting clutch assembly, thereby saving cost. With this configuration if there is a loss of traction at either wheel, leading to a rapid speed up of the motor, a single torque limiting clutch assembly will prevent damage to the entire drive train under severe loading conditions, i.e., when traction is regained. It should be understood, however, that the torque limiting clutch assembly of the present invention can be incorporated into both planetary drive systems if desired, or if necessary, for example in drive trains that do not incorporate the differential into the motor's rotor shaft.

During normal operation, clutch assembly 219 prevents rotation of ring gear 223 relative to housing 221. As described below, the clutch assembly is comprised of alternating plates, with each plate being locked into either the housing or the ring gear. As in a typical clutch assembly, the plates are either fabricated from, or coated with, a high friction material. The clutch assembly is preloaded, preferably using a spring member, thereby preventing the alternating plates from freely rotating relative to one another. During a severe loading event, for example due to excessive torque being quickly applied by the motor or when wheel traction is lost and then regained, the preload force applied by the spring member is temporarily overcome, thereby allowing the plates within clutch assembly 219 to slip. This slippage, in turn, prevents potential vehicle damage by limiting the torque applied to the vehicle's drive train.

It will be appreciated that the preload force applied by the spring member, which in turn defines the amount of overload that the torque limiting clutch assembly can withstand prior to allowing slippage, is based on the specific design requirements selected for a particular drive train (i.e., available motor torque, axel strength, gear teeth, etc.). In one preferred configuration, the inventors set the preload force applied to the clutch assembly such that clutch slippage occurs at approximately 1.2 to 1.4 times the motor's maximum available torque.

Figure 3:
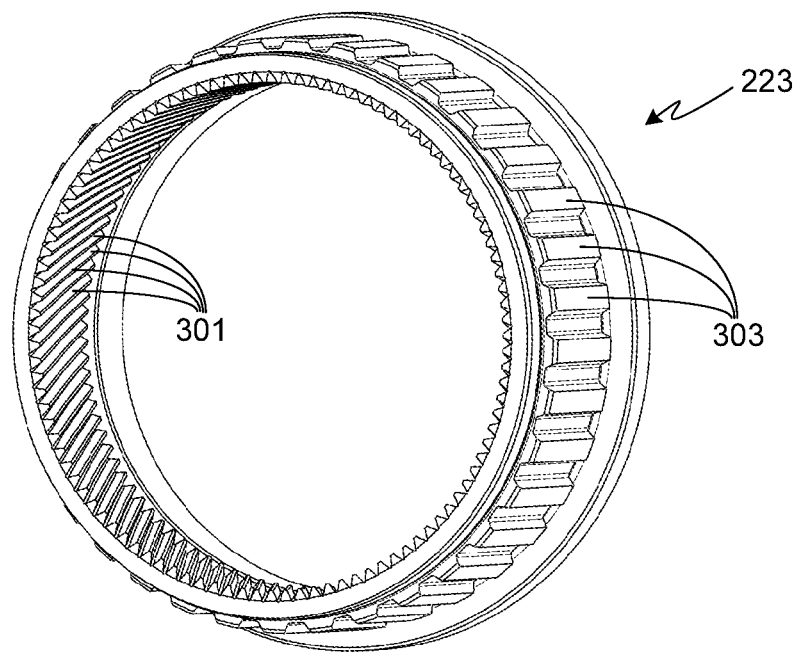
FIG. 3 provides a perspective view of the ring gear illustrated in FIG. 2.
Figure 4:
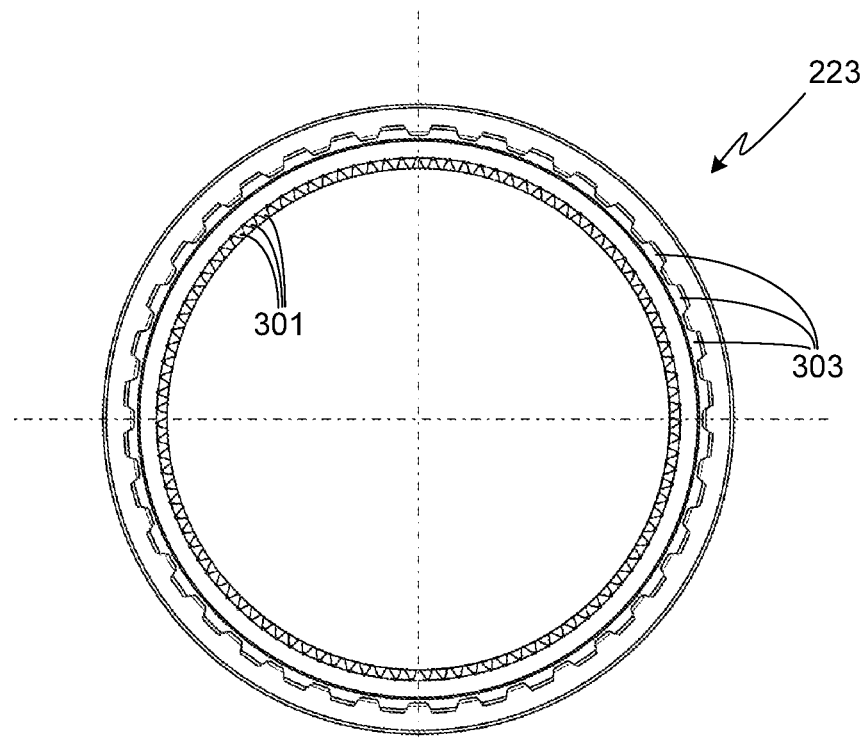
FIG. 4 provides a plane view of the ring gear illustrated in FIGS. 2 and 3.

FIG. 3 provides a perspective view of ring gear 223. FIG. 4 provides a plane view of the same ring gear. The inside surface of ring gear 223 includes gear teeth 301, which are configured to mesh with the planetary gears. The outside surface of ring gear 223 includes a plurality of teeth-like features 303.

Figure 5:
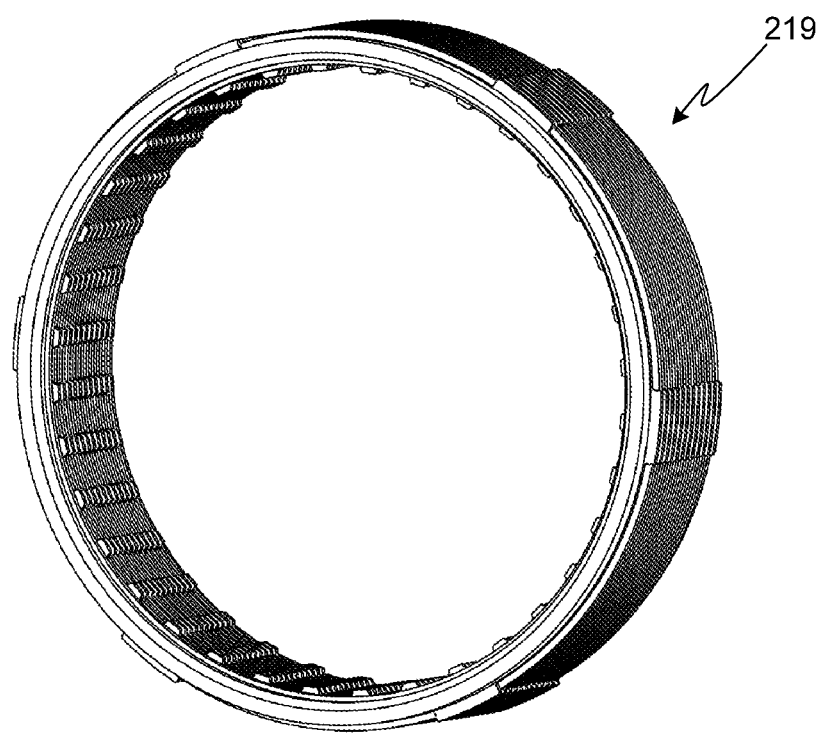
FIG. 5 provides a perspective view of the torque limiting clutch assembly illustrated in FIG. 2.
Figure 6:
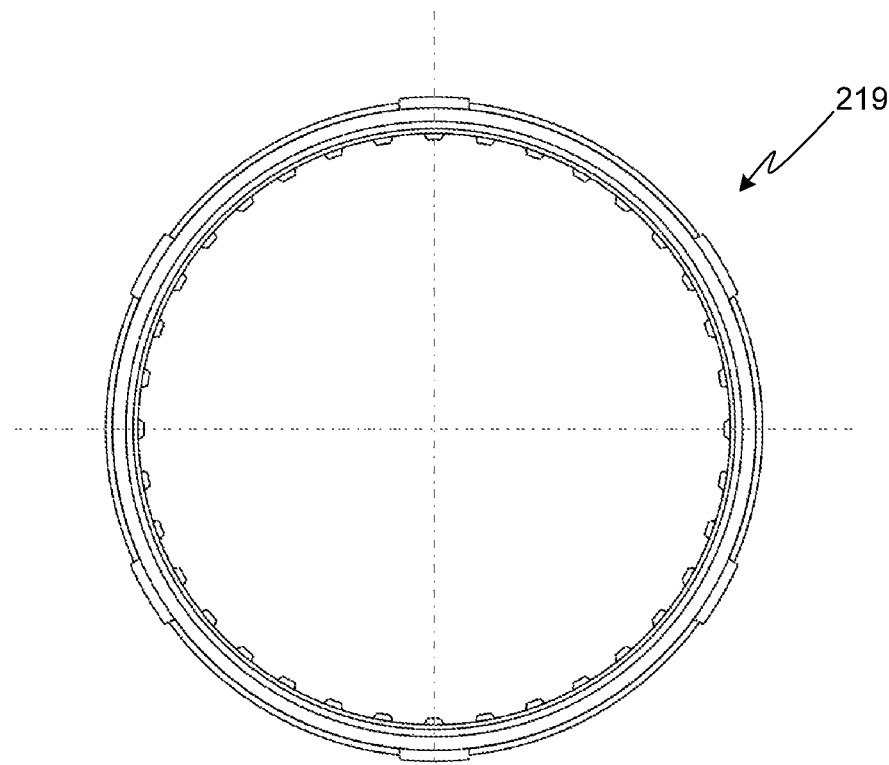
FIG. 6 provides a plane view of the torque limiting clutch assembly illustrated in FIGS. 2 and 5.
Figure 7:
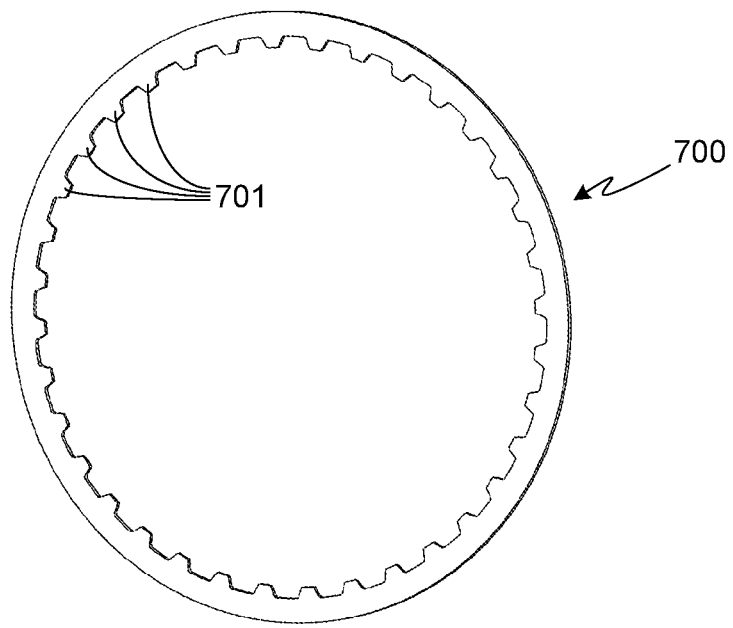
FIG. 7 provides a perspective view of one of the plates comprising the torque limiting clutch assembly of the invention.
Figure 8:
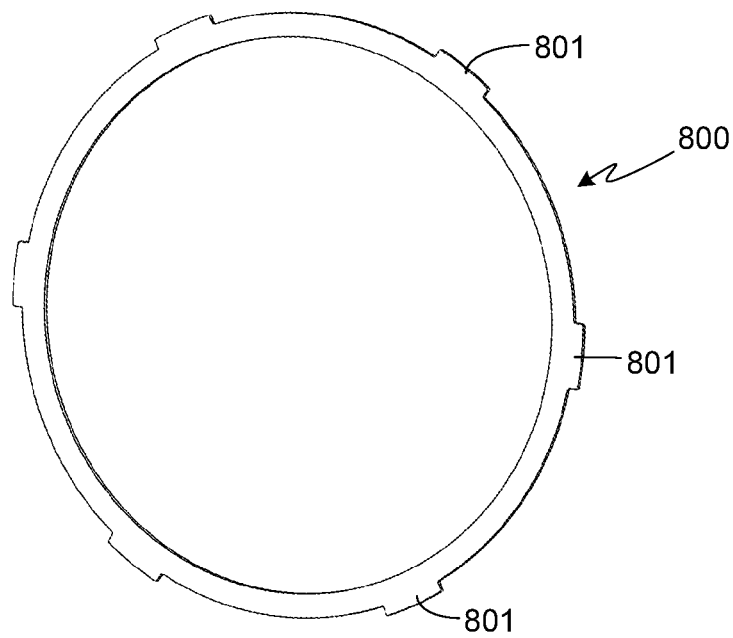
FIG. 8 provides a perspective view of another of the plates comprising the torque limiting clutch assembly of the invention.

FIGS. 5 and 6 provide perspective and plane views, respectively, of the torque limiting clutch assembly 219 of the invention. Clutch assembly 219 is comprised of alternating plates 700 and 800, shown respectively in FIGS. 7 and 8. Plates 700 include a plurality of features 701 that are complementary to features 303 located on the outside surface of ring gear 223. When clutch assembly 219 is located around ring gear 223, complementary features 303 and 701 interlock, thereby preventing the rotation of plates 700 about the ring gear. Complementary features 303 and 701 are preferably comprised of teeth as illustrated, thereby providing a strong mechanical coupling between ring gear 223 and plates 700.

Figure 9:
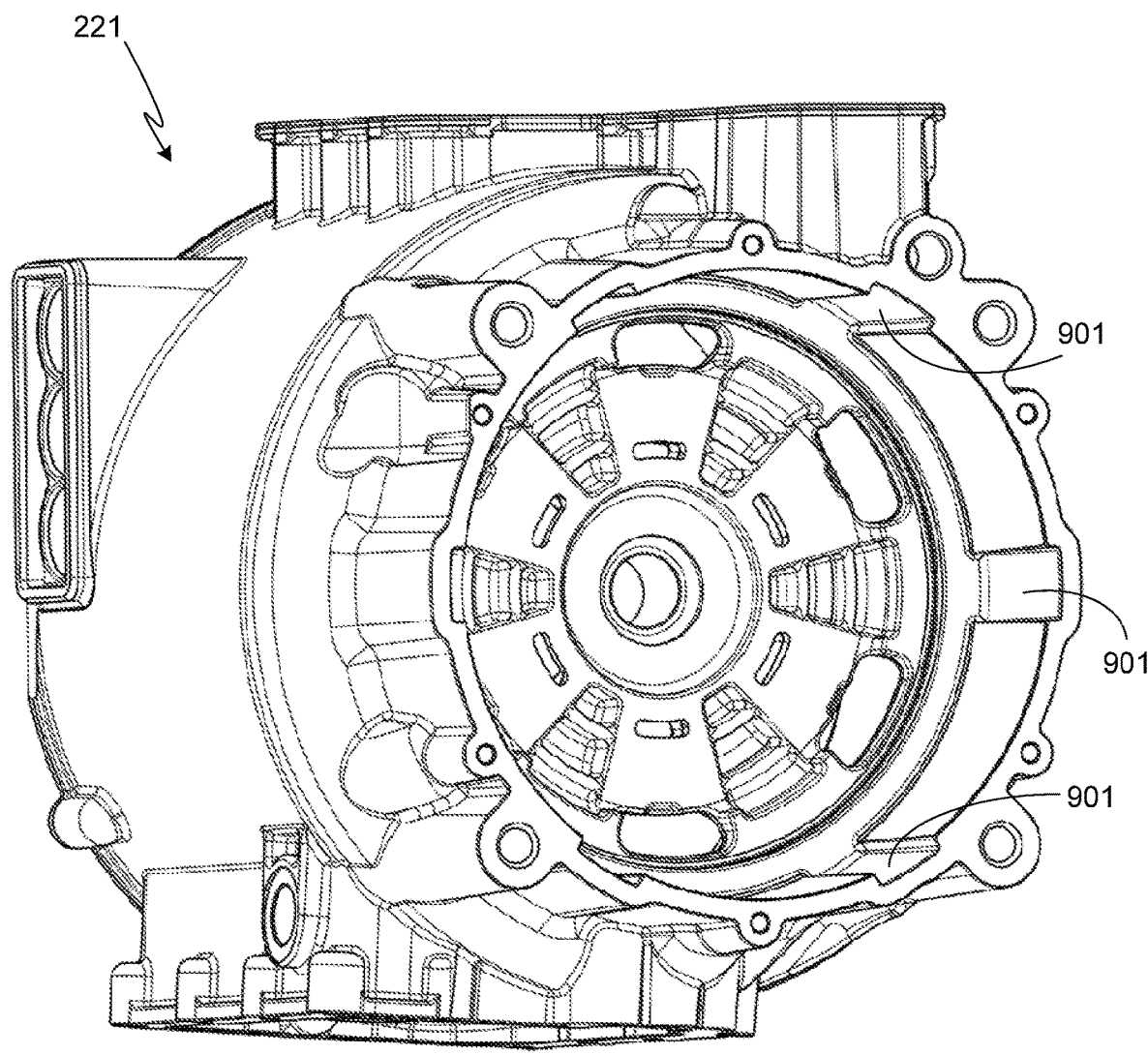
FIG. 9 provides a perspective view of the end of the motor housing and the features integrated into the motor housing that are designed to mate with the torque limiting clutch assembly of the invention.

Plates 800, which alternate with plates 700 in clutch assembly 219, have external features 801, preferably teeth as shown, that are configured to align and mate with complementary features 901 in housing 221 (see FIG. 9). When clutch assembly 219 is located within housing 221, teeth 801 slide into complementary grooves 901 within the housing. As a result, plates 800 are locked in place and unable to rotate.

Figure 10:
FIG. 10 provides a perspective view of the torque limiting clutch assembly of the invention, this view being similar to that shown in FIG. 5 with the addition of a conical spring member.
Figure 11:
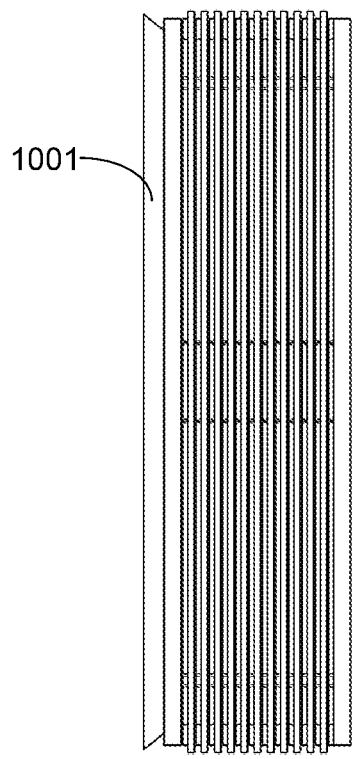
FIG. 11 provides a side view of the assembly illustrated in FIG. 10.
Figure 12:
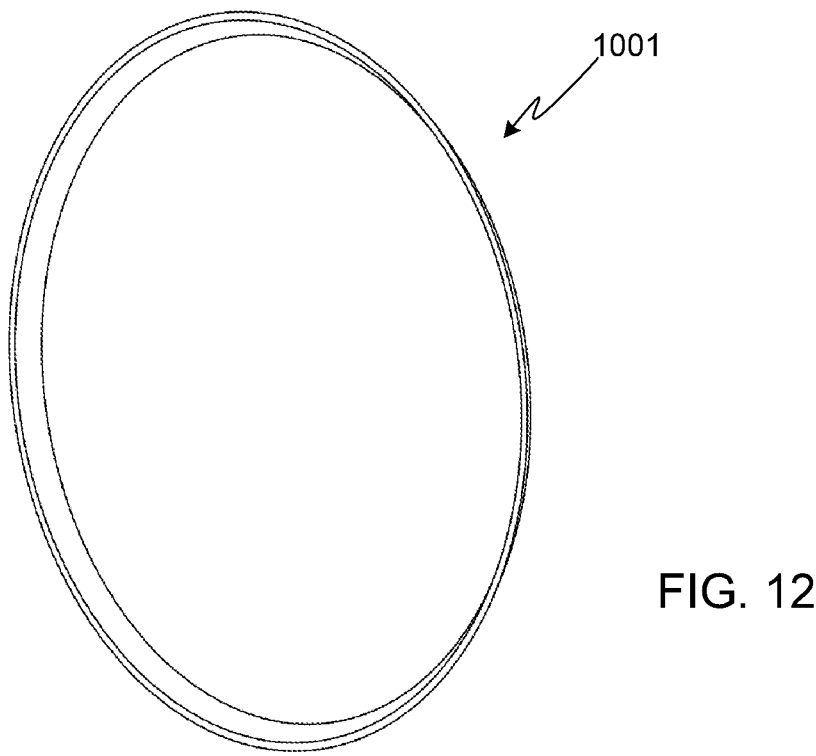
FIG. 12 provides a perspective view of the conical spring member used to preload the torque limiting clutch assembly.

FIG. 10 provides a perspective view of clutch assembly 219, this view being similar to that shown in FIG. 5 with the addition of a conical spring member 1001. FIG. 11 provides a side view of this same assembly. FIG. 12 provides a perspective view of conical spring member 1001 by itself.

As previously described, torque limiting clutch assembly 219 is preloaded, thereby preventing rotation of ring 223 relative to motor housing 221 except during those times in which the applied torque is great enough to overcome the preloading force. To preload the clutch assembly, a spring member 1001 is located within the clutch assembly, preferably at one end of the clutch assembly as shown. When the clutch assembly 219 is mounted within the housing 221, and the planetary assembly 207 is locked (e.g., bolted) into place, spring member 1001 is compressed. Compressing spring member 1001 applies pressure on the stack of plates 800/900 of the clutch assembly, thereby preventing rotation of the ring member of the planetary assembly relative to the housing under normal operating conditions and allowing motor torque to be applied to the drive train.

In a preferred embodiment, a secondary feature of the clutch assembly is used to further preload the clutch. As described in detail below, the secondary feature only adds preloading force to the clutch assembly when the motor/wheels are turning. As a result of the secondary feature, the amount of preloading force applied by spring member 1001 can be decreased since the secondary feature adds preloading force to the clutch assembly when the motor/wheels are turning. In this embodiment, it is the combination of the spring member and the secondary feature that achieves the desired level of preloading force applied to the clutch assembly.

Figure 13:
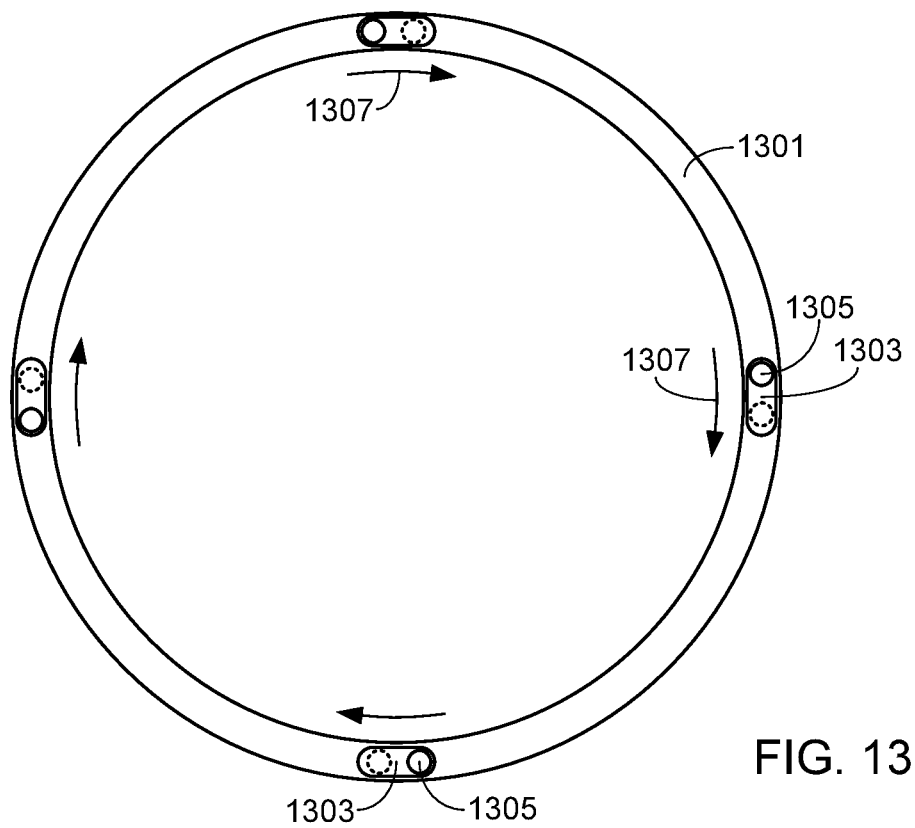
FIG. 13 provides a plane view of a ring member incorporated into the torque limiting clutch assembly of a preferred embodiment of the invention, this member incorporating a secondary feature used to preload the clutch assembly.
Figure 14:
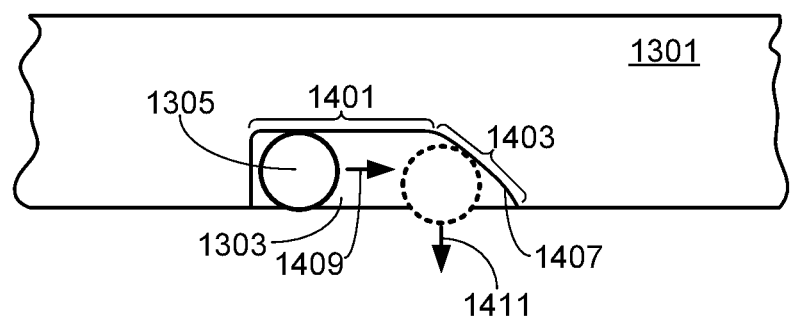
FIG. 14 provides a cross-sectional view of a portion of the clutch assembly ring member shown in FIG. 13.

As shown in FIGS. 13 and 14, the secondary feature adds another ring member 1301 to the clutch assembly. Ring member 1301 is rigidly coupled to the housing and, if preferred, can be directly formed into the face of the housing wall against which the clutch assembly rests. The face of ring member 1301 that is adjacent to the clutch plate stack includes a plurality of slots 1303. Slots 1303 are uniformly spaced about the ring member. Preferably four slots 1303 are used as shown, although it will be appreciated that a fewer or a greater number of slots may be used. As shown in the cross-sectional view of FIG. 14, a portion 1401 of each slot 1303 has a uniform depth while a second portion 1403 has a non-uniform depth due to sloping slot wall 1407. Within each slot 1303 is a ball 1305, e.g., a ball bearing fabricated from stainless steel, chrome steel, ceramic or other material. Balls 1305 are sized such that they extend slightly out and away from the face of ring member 1301. Therefore each ball 1305 is always in contact with the immediately adjacent plate of the clutch assembly.

Assuming that if the clutch assembly slips it rotates in a direction 1307, slots 1303 are oriented such that sloping portion 1403 of each slot is at the trailing end of the slot as shown. As a result, if the clutch assembly begins to slip, it forces the balls 1305 within each slot 1303 to move from the uniform portion 1401 of the slot to the sloped portion 1403 of the slot. Due to the slope of wall 1407, as the balls 1305 move in a direction 1409, wall 1407 forces the balls to move outward in a direction 1411. This, in turn, steadily increases the preload force applied to the clutch assembly. It should be understood that in order for the secondary loading feature to work as described, the clutch assembly plate that is immediately adjacent to ring member 1301 and balls 1305 must be one of the clutch plates that rotates relative to the housing when the clutch assembly slips, i.e., a plate 700.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A torque limiting clutch assembly, comprising:
   a clutch plate assembly, comprising:
      a plurality of first clutch plates; and
      a plurality of second clutch plates, said first clutch plates and said second clutch plates interlaced to form an alternating pattern of said first clutch plates and said second clutch plates;
   a planetary gear assembly, wherein said clutch plate assembly encircles said planetary gear assembly, wherein a coupling between a ring gear of said planetary gear assembly and each first clutch plate of said plurality of first clutch plates interlocks each first clutch plate to said ring gear;
   an electric motor housing member, said clutch plate assembly mounted within said electric motor housing member, wherein a coupling between said electric motor housing member and each second clutch plate of said plurality of second clutch plates interlocks each second clutch plate to said electric motor housing member; and
   a conical spring member configured to apply a preloading force on said clutch plate assembly, wherein said conical spring is compressed when said torque limiting clutch assembly and said planetary gear assembly are mounted to said electric motor housing member, wherein said preloading force prevents rotation of said ring gear relative to said electric motor housing under a first operating condition, and wherein said preloading force is insufficient to prevent rotation of said ring gear relative to said electric motor housing under a second operating condition.

2. The torque limiting clutch assembly of claim 1, wherein said torque limiting clutch assembly is integrated into a vehicle drive train, wherein said first operating condition is defined as a normal vehicle operating condition, wherein said second operating condition is defined as a severe vehicle drive train loading condition, wherein during said severe vehicle drive train loading condition a torque level is applied to said torque limiting clutch assembly that exceeds said preloading force and allows slippage between said plurality of first clutch plates and said plurality of said second clutch plates.

3. The torque limiting clutch assembly of claim 1, wherein said coupling between said ring gear of said planetary gear assembly and each first clutch plate of said plurality of first clutch plates further comprises a first plurality of features formed on an exterior surface of said ring gear and a second plurality of features corresponding to each first clutch plate of said plurality of first clutch plates, wherein said first plurality of features are complementary to said second plurality of features.

4. The torque limiting clutch assembly of claim 3, wherein said first plurality of features comprise a first plurality of teeth formed on said exterior surface of said ring gear, wherein said second plurality of features comprise a second plurality of teeth formed on an inner cylindrical surface of each first clutch plate of said plurality of first clutch plates, and wherein said first plurality of teeth and said second plurality of teeth are configured to interlock when said clutch plate assembly encircles said planetary gear assembly.

5. The torque limiting clutch assembly of claim 1, wherein said coupling between said electric motor housing member and each second clutch plate of said plurality of second clutch plates further comprises a first plurality of features formed on an interior surface of said electric motor housing member and a second plurality of features corresponding to each second clutch plate of said plurality of second clutch plates, wherein said first plurality of features are complementary to said second plurality of features.

6. The torque limiting clutch assembly of claim 5, wherein said first plurality of features comprise a first plurality of teeth formed on said interior surface of said electric motor housing member, wherein said second plurality of features comprise a second plurality of teeth formed on a cylindrical exterior surface of each second clutch plate of said plurality of second clutch plates, and wherein said first plurality of teeth and said second plurality of teeth are configured to interlock when said clutch plate assembly is mounted within said electric motor housing member.

7. The torque limiting clutch assembly of claim 1, wherein each first clutch plate of said plurality of first clutch plates and each second clutch plate of said plurality of second clutch plates is fabricated from a high friction material.

8. The torque limiting clutch assembly of claim 1, wherein each first clutch plate of said plurality of first clutch plates and each second clutch plate of said plurality of second clutch plates is coated with a high friction material.

9. The torque limiting clutch assembly of claim 1, further comprising a secondary feature configured to apply an additional preloading force on said clutch plate assembly, said secondary feature comprising:
   a ring member proximate to an end clutch plate of said clutch plate assembly, wherein said end clutch plate is an end first clutch plate of said plurality of first clutch plates;
   a plurality of slots formed within a surface of said ring member, said surface of said ring member proximate to said end clutch plate of said clutch plate assembly, wherein each slot of said plurality of slots is of a non-uniform depth; and
   a plurality of balls, wherein each ball of said plurality of balls is held within a corresponding slot of said plurality of slots, wherein a diameter corresponding to each ball of said plurality of balls exceeds a maximum depth corresponding to each slot of said plurality of slots, wherein during rotation of said end clutch plate relative to said ring member each ball of said plurality of balls moves from a first slot region towards a second slot region, wherein said second slot region is shallower than said first slot region, and wherein motion of each ball of said plurality of balls from said first slot region towards said second slot region compresses said clutch plate assembly.

10. The torque limiting clutch assembly of claim 9, wherein said ring member is integral to said electric motor housing member.

11. The torque limiting clutch assembly of claim 9, wherein said plurality of balls is comprised of a plurality of ball bearings.

12. A torque limiting clutch assembly, comprising:
a clutch plate assembly, comprising:
a plurality of first clutch plates; and
a plurality of second clutch plates, said first clutch plates and said second clutch plates interlaced to form an alternating pattern of said first clutch plates and said second clutch plates;
a planetary gear assembly, wherein said clutch plate assembly encircles said planetary gear assembly, wherein a coupling between a ring gear of said planetary gear assembly and each first clutch plate of said plurality of first clutch plates interlocks each first clutch plate to said ring gear;
an electric motor housing member, said clutch plate assembly mounted within said electric motor housing member, wherein a coupling between said electric motor housing member and each second clutch plate of said plurality of second clutch plates interlocks each second clutch plate to said electric motor housing member;
a spring member configured to apply a preloading force on said clutch plate assembly, wherein said preloading force prevents rotation of said ring gear relative to said electric motor housing under a first operating condition, and wherein said preloading force is insufficient to prevent rotation of said ring gear relative to said electric motor housing under a second operating condition;
a secondary feature configured to apply an additional preloading force on said clutch plate assembly, said secondary feature comprising:
a ring member proximate to an end clutch plate of said clutch plate assembly, wherein said end clutch plate is an end first clutch plate of said plurality of first clutch plates;
a plurality of slots formed within a surface of said ring member, said surface of said ring member proximate to said end clutch plate of said clutch plate assembly, wherein each slot of said plurality of slots is of a non-uniform depth; and
a plurality of balls, wherein each ball of said plurality of balls is held within a corresponding slot of said plurality of slots, wherein a diameter corresponding to each ball of said plurality of balls exceeds a maximum depth corresponding to each slot of said plurality of slots, wherein during rotation of said end clutch plate relative to said ring member each ball of said plurality of balls moves from a first slot region towards a second slot region, wherein said second slot region is shallower than said first slot region, and wherein motion of each ball of said plurality of balls from said first slot region towards said second slot region compresses said clutch plate assembly.

13. The torque limiting clutch assembly of claim 12, wherein said ring member is integral to said electric motor housing member.

14. The torque limiting clutch assembly of claim 12, wherein said torque limiting clutch assembly is integrated into a vehicle drive train, wherein said first operating condition is defined as a normal vehicle operating condition, wherein said second operating condition is defined as a severe vehicle drive train loading condition, wherein during said severe vehicle drive train loading condition a torque level is applied to said torque limiting clutch assembly that exceeds said preloading force and allows slippage between said plurality of first clutch plates and said plurality of said second clutch plates.

15. The torque limiting clutch assembly of claim 12, wherein said coupling between said ring gear of said planetary gear assembly and each first clutch plate of said plurality of first clutch plates further comprises a first plurality of features formed on an exterior surface of said ring gear and a second plurality of features corresponding to each first clutch plate of said plurality of first clutch plates, wherein said first plurality of features are complementary to said second plurality of features.

16. The torque limiting clutch assembly of claim 15, wherein said first plurality of features comprise a first plurality of teeth formed on said exterior surface of said ring gear, wherein said second plurality of features comprise a second plurality of teeth formed on an inner cylindrical surface of each first clutch plate of said plurality of first clutch plates, and wherein said first plurality of teeth and said second plurality of teeth are configured to interlock when said clutch plate assembly encircles said planetary gear assembly.

17. The torque limiting clutch assembly of claim 12, wherein said coupling between said electric motor housing member and each second clutch plate of said plurality of second clutch plates further comprises a first plurality of features formed on an interior surface of said electric motor housing member and a second plurality of features corresponding to each second clutch plate of said plurality of second clutch plates, wherein said first plurality of features are complementary to said second plurality of features.

18. The torque limiting clutch assembly of claim 17, wherein said first plurality of features comprise a first plurality of teeth formed on said interior surface of said electric motor housing member, wherein said second plurality of features comprise a second plurality of teeth formed on a cylindrical exterior surface of each second clutch plate of said plurality of second clutch plates, and wherein said first plurality of teeth and said second plurality of teeth are configured to interlock when said clutch plate assembly is mounted within said electric motor housing member.

19. The torque limiting clutch assembly of claim 12, wherein each first clutch plate of said plurality of first clutch plates and each second clutch plate of said plurality of second clutch plates is fabricated from a high friction material.

20. The torque limiting clutch assembly of claim 12, wherein each first clutch plate of said plurality of first clutch plates and each second clutch plate of said plurality of second clutch plates is coated with a high friction material.

* * * * *